(12) United States Patent
Tian

(10) Patent No.: US 10,158,691 B2
(45) Date of Patent: Dec. 18, 2018

(54) METHOD AND APPARATUS FOR PROVIDING NETWORK RESOURCES AT INTERMEDIARY SERVER

(71) Applicant: GUANGZHOU UCWEB COMPUTER TECHNOLOGY CO., LTD., Guangzhou (CN)

(72) Inventor: Wen Tian, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 296 days.

(21) Appl. No.: 14/980,897

(22) Filed: Dec. 28, 2015

(65) Prior Publication Data

US 2016/0112492 A1 Apr. 21, 2016

Related U.S. Application Data

(63) Continuation of application No. PCT/CN2013/090638, filed on Dec. 27, 2013.

(30) Foreign Application Priority Data

Jun. 29, 2013 (CN) .......................... 2013 1 0268280

(51) Int. Cl.
  *H04L 29/08* (2006.01)
  *G06F 17/30* (2006.01)
(52) U.S. Cl.
  CPC ........ *H04L 67/02* (2013.01); *G06F 17/30011* (2013.01); *G06F 17/3089* (2013.01);
  (Continued)
(58) Field of Classification Search
  USPC .......................... 709/217, 232, 247, 202, 246
  See application file for complete search history.

(56) References Cited

U.S. PATENT DOCUMENTS

| 8,464,066 B1 * | 6/2013 | Price .................. H04L 63/10 709/217 |
| 8,522,131 B1 * | 8/2013 | Geddes ............ G06F 17/30902 715/234 |

(Continued)

FOREIGN PATENT DOCUMENTS

| CN | 102184231 | 9/2011 |
| CN | 102185923 | 9/2011 |

(Continued)

OTHER PUBLICATIONS

PCT International Search Report dated Apr. 3, 2014, issued in corresponding International Application No. PCT/CN2013/090638 (5 pages).

(Continued)

*Primary Examiner* — Jude Jean Gilles
(74) *Attorney, Agent, or Firm* — Sheppard Mullin Richter Hampton LLP

(57) ABSTRACT

A method for providing access to web content by an intermediary server is provided. The method comprises: receiving, from a mobile terminal, a loading request for a web page; receiving, from a content server, document data of the web page after forwarding the web page loading request to the content server; dividing the received document data into a plurality of document data segments; identifying sub-resources included in the web page; associating the sub-resources with the document data segments; transmitting requests sequentially for the identified sub-resources to a resource server to start transmissions of at least some of the identified sub-resources from the resource server to the intermediary server; and transmitting, to the mobile terminal, a first document data segment of the plurality of document data segments after the transmissions of all of sub-resources associated with the first document data seg- (Continued)

ment from the resource server to the intermediary server have completed.

26 Claims, 6 Drawing Sheets

(52) U.S. Cl.
CPC ........ *G06F 17/30902* (2013.01); *H04L 67/06* (2013.01); *H04L 67/28* (2013.01)

(56) References Cited

U.S. PATENT DOCUMENTS

| | | | | |
|---|---|---|---|---|
| 8,994,967 | B1* | 3/2015 | Mayers | G06F 17/30964 358/1.13 |
| 9,571,556 | B2* | 2/2017 | He | G06F 17/30899 |
| 2008/0291835 | A1* | 11/2008 | Cardona | H04L 49/90 370/241 |
| 2008/0291933 | A1* | 11/2008 | Cardona | H04L 49/90 370/412 |
| 2009/0129377 | A1* | 5/2009 | Chamberlain | G06Q 30/0201 370/389 |
| 2010/0042497 | A1* | 2/2010 | Pritchard | G06Q 30/02 705/14.49 |
| 2011/0083082 | A1* | 4/2011 | Gottwald | G06F 17/30899 715/744 |
| 2012/0278439 | A1* | 11/2012 | Ahiska | H04L 67/2852 709/218 |
| 2014/0237296 | A1* | 8/2014 | Shanahan | G06F 11/3624 714/38.14 |

FOREIGN PATENT DOCUMENTS

| | | |
|---|---|---|
| CN | 102682093 A | 9/2012 |
| CN | 102760133 | 10/2012 |
| CN | 102955852 A | 3/2013 |
| CN | 103345498 A | 10/2013 |
| WO | WO 2008/098164 A2 | 8/2008 |
| WO | WO 2014/206050 A1 | 12/2014 |

OTHER PUBLICATIONS

International Written Opinion for PCT/CN2013/090638, dated Apr. 3, 2014.
International Preliminary Report on Patentability for PCT/CN2013/090638, dated Dec. 29, 2015.
First Notice issued by China State Intellectual Property Office, dated Dec. 15, 2015 for Chinese Patent Application No. 201310268280.X with search report.
Second Notice issued by China State Intellectual Property Office, dated Jun. 23, 2016 for Chinese Patent Application No. 201310268280.X.
Third Notice issued by China State Intellectual Property Office, dated Sep. 21, 2016 for Chinese Patent Application No. 201310268280.X with search report.
Fourth Notice issued by China State Intellectual Property Office, dated Mar. 3, 2017 for Chinese Patent Application No. 201310268280.X.

* cited by examiner

METHOD AND APPARATUS FOR PROVIDING NETWORK RESOURCES AT INTERMEDIARY SERVER

CROSS-REFERENCE TO RELATED APPLICATION

This application is a continuation application of International Application No. PCT/CN2013/090638, filed Dec. 27, 2013, which is based upon and claims priority to Chinese Patent Application No. 201310268280.X, filed Jun. 29, 2013. The entire contents of the above referenced applications are incorporated herein by reference.

TECHNICAL FIELD

The present disclosure generally relates to the technology that facilitates web browsing, and in particular, to method and apparatus for providing network resource at an intermediary server.

BACKGROUND

Webpage loading speed is an important indicator for evaluating browser products. Based on response times perceivable by a user, browser loading speed can be evaluated using different time metrics T0, T1, T2, and T3. Here, T0 refers to a time between the transmission of a request by a user and the presentation of a web page title. T1 refers to a time between the transmission of a request by a user and the presentation of a web page title. T2 refers to a time between the transmission of a request by a user and the presentation of a first line of a web page. T3 refers to a time between the transmission of a request by a user and the presentation of the entirety of the web page. Among these metrics, T1 and T3 are more important, because T1 represents the time that the user needs to wait before browsing of a web page starts, while T3 represents the time that the user needs to wait before a complete web page is available for browsing.

Webpage loading at a mobile terminal can be performed in two different ways. Most mobile terminal browsers can directly access a web page content server (e.g., a target server) to load a web page and the sub-resources associated therewith. On the other hand, mobile terminal browsers can also submit a request to an intermediary server (e.g., a proxy server) instead of the content server. The intermediary server can then forward the request to the content server, which then transmits the data for the requested web page to the intermediary server. The intermediary server can provide the data to the browsers.

As can be understood from above, directly accessing a web page content server to load a web page, instead of accessing an intermediary server, can save the time required for the transaction between the intermediary server and the content server, and can lead to faster loading of the web page. However, there is no defined order of loading the sub-resources associated with the web page, which can lead to longer loading time and unstable loading speed. On the other hand, intermediary servers are typically designed to maintain a specific order of transmission of the sub-resources, such as an order as defined in the web page, to the browser. Such an arrangement can improve and stabilize loading speed of a web page. As a result, using intermediary server to provide web page loading has become mainstream.

However, with the current technology, intermediary server typically finishes acquiring all of the sub-resources of the web page from the content server before providing the web page to the mobile terminal browser. As a result, it can take a long time to display the web page on the mobile terminal browser.

SUMMARY

As discussed above, with the current technology, intermediary server typically finishes acquiring all of the sub-resources of the web page from the content server before providing the web page to the mobile terminal browser, which can lead to slow loading of the webpage at the browser. Embodiments of the present disclosure provide methods and systems for providing network resource at an intermediary server, where the intermediary server can provide some sub-resources of a web page to a requesting browser while obtaining other sub-resources from the content server. Moreover, the sub-resources are provided to the browser in the same order as the sub-resources are displayed in the webpage. As a result, the loading speed of the webpage can be improved.

Embodiments of the present disclosure provide a method for providing access to web content, the method being performed by an intermediary server. The method comprises: receiving, from a mobile terminal, a loading request for a web page; receiving, from a content server, document data of the web page after forwarding the web page loading request to the content server; dividing the received document data into a plurality of document data segments; identifying sub-resources included in the web page; associating the identified sub-resources with the document data segments; transmitting a plurality of requests sequentially for the identified sub-resources to a resource server to start transmissions of at least some of the identified sub-resources from the resource server to the intermediary server; and transmitting, to the mobile terminal, a first document data segment of the plurality of document data segments, after the transmissions of all of sub-resources associated with the first document data segment from the resource server to the intermediary server have completed.

In some embodiments, the receiving, from a content server, document data of the web page after forwarding the web page loading request to the content server comprises: receiving a plurality of portions of document data from the content server.

In some embodiments, the one or more sizes of the plurality of document data portions are defined based on a file transfer protocol that comprises a Transmission Control Protocol/Internet Protocol.

In some embodiments, at least some of the plurality of document data segments are of different sizes.

In some embodiments, the web page loading request includes an indicator configured to indicate that the intermediary server divides the received document data into a plurality of document data segments.

In some embodiments, each of the plurality of document data segments is associated with a number that reflects an order of the document data segments in the document data. The method further comprises: determining that a second document data segment is associated with a first sub-resource of which the transmission from the resource server is incomplete and with a second sub-resource of which the transmission is complete; determining that a third document data segment is associated with a third sub-resource of which the transmission is complete, wherein the third document data segment is behind the second document data segment in the document data; and transmitting the second document data segment with the second sub-resource when the transmission of the first sub-resource is incomplete, if the second document data segment is associated with a number that satisfies a pre-determined condition. In some embodiments, the pre-determined condition includes the second document data segment being associated with a minimum number among other document data segments that are associated with sub-resources of which transmission has not been completed.

In some embodiments, the method further comprises: determining that transmission of the first sub-resource from the resource server is complete; and transmitting the first sub-resource with the third document data to the mobile terminal.

In some embodiments, the identified sub-resources are sequentially associated with the document data segments based on an order of the document data segments.

Embodiments of the present disclosure also provide a non-transitory computer readable medium that stores a program that, when executed by a processor, causes the processor to perform the aforementioned method for providing access to web content.

Embodiments of the present disclosure also provide an intermediary server for providing access to web content. The intermediary server comprises a memory that stores a set of instructions; and one or more processors configured to execute the set of instructions to cause the intermediary server to perform: receiving, from a mobile terminal, a loading request for a web page; receiving, from a content server, document data of the web page after forwarding the web page loading request to the content server; dividing the received document data into a plurality of document data segments; identifying sub-resources included in the web page; associating the identified sub-resources with the document data segments; transmitting a plurality of requests sequentially for the identified sub-resources to a resource server to start transmissions of at least some of the identified sub-resources from the resource server to the intermediary server; and transmitting, to the mobile terminal, a first document data segment of the plurality of document data segments, after the transmissions of all of sub-resources associated with the first document data segment from the resource server to the intermediary server have completed.

In some embodiments, the receiving, from a content server, document data of the web page after forwarding the web page loading request to the content server comprises receiving a plurality of portions of document data from the content server.

In some embodiments, the one or more sizes of the plurality of document data portions are defined based on a file transfer protocol that comprises a Transmission Control Protocol/Internet Protocol.

In some embodiments, at least some of the plurality of document data segments are of different sizes.

In some embodiments, the web page loading request includes an indicator configured to indicate that the intermediary server divides the received document data into a plurality of document data segments.

In some embodiments, each of the plurality of document data segments is associated with a number that reflects an order of the document data segments in the document data. The one or more processors are further configured to execute the set of instructions for: determining that a second document data segment is associated with a first sub-resource of which the transmission from the resource server is incomplete and with a second sub-resource of which the transmission is complete; determining that a third document data segment is associated with a third sub-resource of which the transmission is complete, wherein the third document data segment is behind the second document data segment in the document data; and transmitting the second document data segment with the second sub-resource when the transmission of the first sub-resource is incomplete, if the second document data segment is associated with a number that satisfies a pre-determined condition. In some embodiments, the pre-determined condition includes the second document data segment being associated with a minimum number among other document data segments that are associated with sub-resources of which transmission has not been completed.

In some embodiments, the one or more processors are further configured to execute the set of instructions for: determining that transmission of the first sub-resource from the resource server is complete; and transmitting the first sub-resource with the third document data to the mobile terminal.

In some embodiments, the identified sub-resources are sequentially associated with the document data segments based on an order of the document data segments.

Embodiments of the present disclosure also provide a non-transitory computer-readable medium that stores a program that, when executed by a processor, causes the processor to perform a method for providing access to web content, the method comprising: receiving, from a mobile terminal, a loading request for a web page; receiving, from a content server, document data of the web page after forwarding the web page loading request to the content server; dividing the received document data into a plurality of document data segments; identifying sub-resources included in the web page; associating the identified sub-resources with the document data segments; transmitting a plurality of requests sequentially for the identified sub-resources to a resource server to start transmissions of at least some of the identified sub-resources from the resource server to the intermediary server; and transmitting, to the mobile terminal, a first document data segment of the plurality of document data segments, after the transmissions of all of sub-resources associated with the first document data segment from the resource server to the intermediary server have completed.

With embodiments of the present disclosure, document data of a web page can be divided into multiple data segments, with each data segment associated with sub-resources. A data segment (and its associated sub-resources) is transmitted to a requesting mobile terminal if all of the sub-resources associated with that data segment have been obtained by the intermediary server. With such an arrangement, the transmission of the sub-resources can follow the same order as the sub-resources are displayed in the web page. As a result, the loading speed of the web page on the mobile terminal can be improved.

It is to be understood that both the foregoing general description and the following detailed description are exemplary and explanatory only and are not restrictive of the disclosed embodiments, as claimed.

DESCRIPTION OF THE EMBODIMENTS

Figure 1:
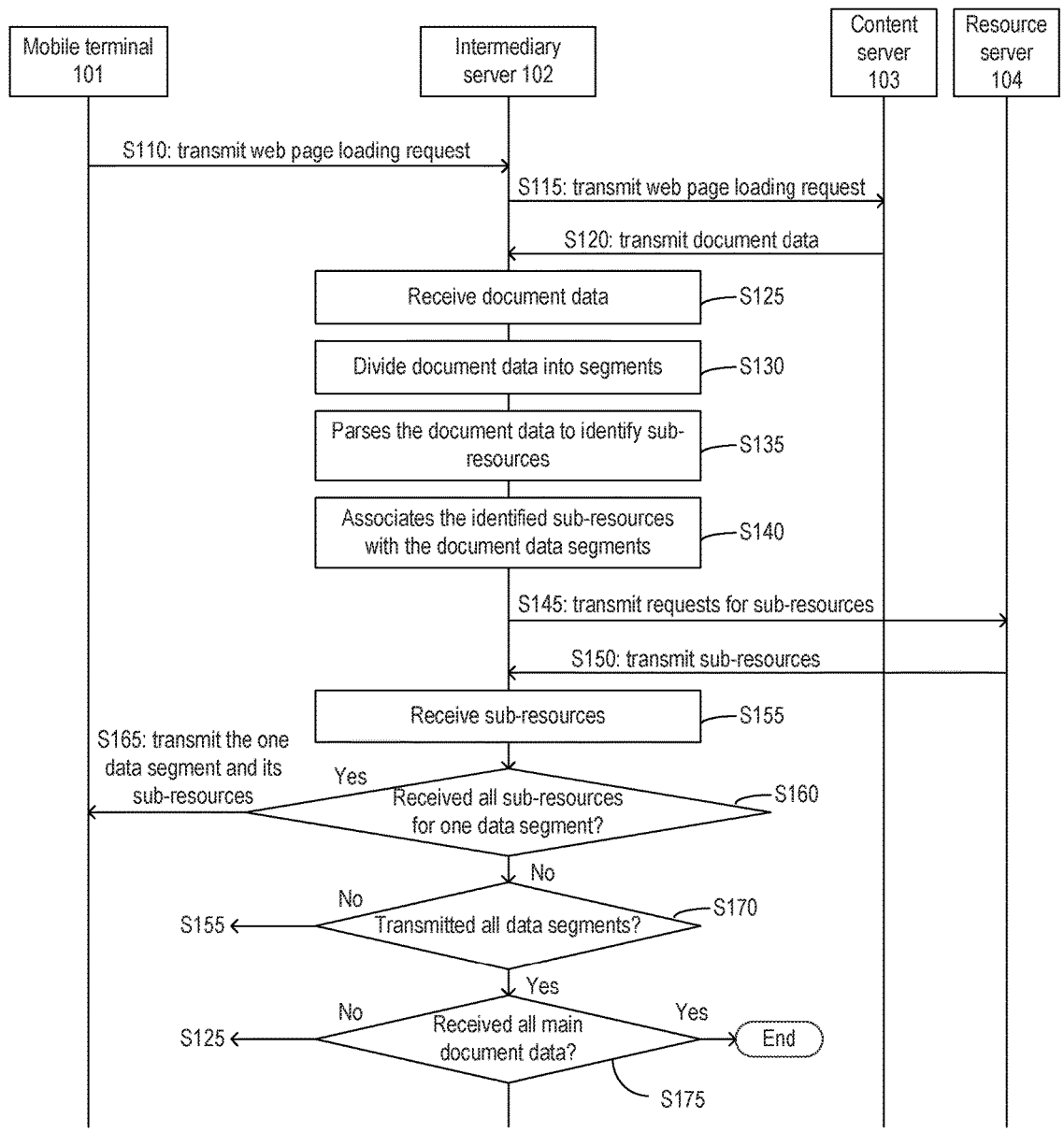
FIG. 1 is a flowchart illustrating a method of providing network resources to a browser, consistent with embodiments of the present disclosure.

As discussed above, with the current technology, intermediary server typically finishes acquiring all of the sub-resources of the web page from the content server before providing the web page to the mobile terminal browser, which can lead to slow loading of the webpage at the browser. An objective of the present disclosure is to provide a method and an apparatus for providing network resource at an intermediary server, where the intermediary server can provide some sub-resources of a web page to a requesting browser while obtaining other sub-resources from the content server, with the sub-resources being provided to the browser in the same order as the sub-resources are displayed in the webpage, to solve the aforementioned problem.

Reference will now be made in detail to methods and specific implementations that seek to overcome the foregoing shortcomings of current systems and methods. According to some embodiments of the present disclosure, a method being performed by an intermediary server for providing access to web content is provided. The method comprises: receiving, from a mobile terminal, a loading request for a web page; receiving, from a content server, document data of the web page after forwarding the web page loading request to the content server; dividing the received document data into a plurality of document data segments; identifying sub-resources included in the web page; associating the identified sub-resources with the document data segments; transmitting a plurality of requests sequentially for the identified sub-resources to a resource server to start transmissions of at least some of the identified sub-resources from the resource server to the intermediary server; and transmitting, to the mobile terminal, a first document data segment of the plurality of document data segments, after the transmissions of all of sub-resources associated with the first document data segment from the resource server to the intermediary server have completed.

According embodiments of the present disclosure, document data of a web page is divided into multiple data segments, with each data segment associated with sub-resources, and each data segment (and its associated sub-resources) is transmitted to a mobile terminal if all of the sub-resources associated with that data segment have been obtained by the intermediary server. With such an arrangement, the transmission of the sub-resources can follow the same order as the sub-resources are displayed in the web page. As a result, the loading speed of the web page on the mobile terminal can be improved.

Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

FIG. 1 is a flowchart illustrating an exemplary method 100 of providing network resources to a browser, consistent with embodiments of the present disclosure. In this illustrative example, loading of webpage data is used to illustrate a transaction in which a requesting mobile terminal obtains network resources (e.g., data for a web page including the associated sub-resources associated) from an intermediary server. The steps of method are performed by a mobile terminal 101, an intermediary server 102, a content server 103, and a resource server 104. In some embodiments, intermediary server 102 can include a proxy server. Mobile terminal 101 can include various kinds of smart mobile terminals, such as smartphones and the like.

As shown in FIG. 1, in step S110, mobile terminal 101 transmits a web page loading request to intermediary server 102. The web page loading request can include an universal resource locator (URL) address of a web page. In step S115, the intermediary server forwards the received web page loading request to content server 103.

In step S120, content server 103 returns document data of the web page requested by the user to intermediary server 102. Herein, the document data can refer to data representing contents of the web page requested by mobile terminal 101. Intermediary server 102 then receives the document data in step S125.

And then in step S130, intermediary server 102 divides the received document data into multiple segments. In one example, the document data can be divided based on a size of the data. For example, the document data can be evenly divided in segments of equal size. In another example, the document data can be divided in segments of pre-determined sizes.

In step S135, after dividing the received document data into multiple segments, intermediary server 102 parses the document data sequentially to identify sub-resources included in the web page, which can include data corresponding to Javascripts (JS), Cascading Style Sheets (CSS), image files, inline frames (iframes), etc.

In step S140, intermediary server 102 associates the sub-resources (identified in step S135) with the document data segments (obtained in step S130). Intermediary server 102 also creates a sequence for requesting the sub-resources based on the association between the sub-resources and the document data segments.

In step S145, intermediary server 102 sequentially transmits requests for the sub-resources, to resource server 104, based on the sequence created in step S140. Resource server 104 then transmits the requested sub-resources to the intermediary server in step S150, and the intermediary server receives the sub-resources transmitted from the resource server in step S155.

In step S160, intermediary server 102 determine whether all of the sub-resources associated with a particular document data segment haven been acquired. If all of the sub-resources associated with that particular document data segment have been acquired, intermediary server 102 can then provide the particular document data segment and its associated sub-resources to mobile terminal 101, without waiting for other document data segments and their associated sub-resources, in step S165. That is, immediately after providing that particular document data segment to mobile terminal 101, intermediary server 102 can provide the associated sub-resources in the same order as these resources appear in the web page. On the other hand, if intermediary server 102 has not acquired all of the sub-resources associated with the document data, intermediary server 102 may continue requesting for the missing sub-resources.

In step S170, intermediary server 102 determines whether all of the document data segments and the associated sub-resources have been transmitted to mobile terminal 101. If not all of the document data segments and the associated sub-resources have been transmitted to mobile terminal 101, intermediary server 102 can determine to continue requesting for and receiving sub-resources. In some cases, if all of the document data segments and the associated sub-resources have been transmitted to mobile terminal 101, method 100 can stop.

In this example, content server 103 can transmit the document data to intermediary server 102 based on a file transfer protocol, such as Transmission Control Protocol/Internet Protocol (TCP/IP). Under the file transfer protocol, the document data can be transmitted to intermediary server 102 in multiple segments, and the size of each segment can be determined based on the protocol.

In a case where intermediary server 102 receives multiple portions of the document data, method 100 further includes step S175. If all of the document data segments (generated in step S125) and the associated sub-resources have been transmitted to mobile terminal 101, intermediary server 102 can perform step S175, in which it determines whether it has acquired all portions of the document data of the web page. If intermediary server 102 determines that it has acquired all of the document data, method 100 can stop. Otherwise, intermediary server 102 can perform steps S125-S175 again to acquire and process additional document data.

In some embodiments, the web page loading request transmitted from mobile terminal 101 (in step S110) may further include an indicator configured to indicate dividing the received document data into segments, and that intermediary server 102 divides the document data based on the indicator in the web page loading request. In a case where the request does not include the indicator, intermediary server 102 can determine not to divide the received document data.

Figure 2:
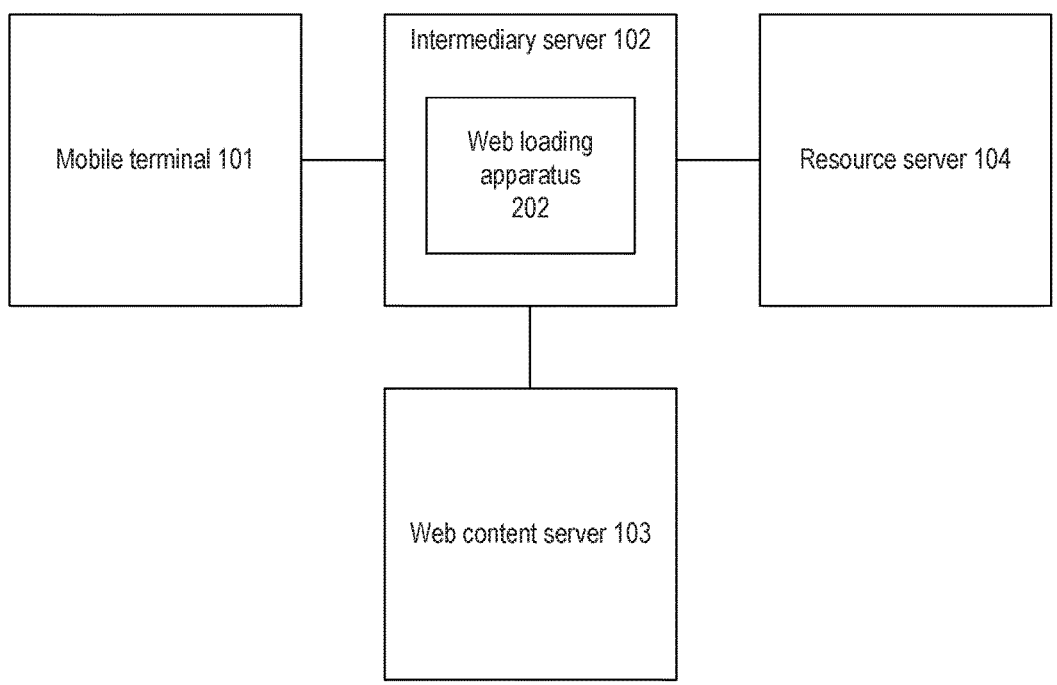
FIG. 2 is a schematic diagram illustrating a system for providing network resources to a browser, consistent with embodiments of the present disclosure.

FIG. 2 is a schematic diagram illustrating an exemplary system 200 for providing network resources to a browser, consistent with embodiments of the present disclosure. As shown in FIG. 2, system 200 includes mobile terminal 101, intermediary server 102, content server 103, and resource server 104 of FIG. 1, each of which can perform some of the steps of method 100 of FIG. 1. As shown in FIG. 2, intermediary server 102 further includes a web loading apparatus 202, the detail of which is illustrated in FIG. 3.

Figure 3:
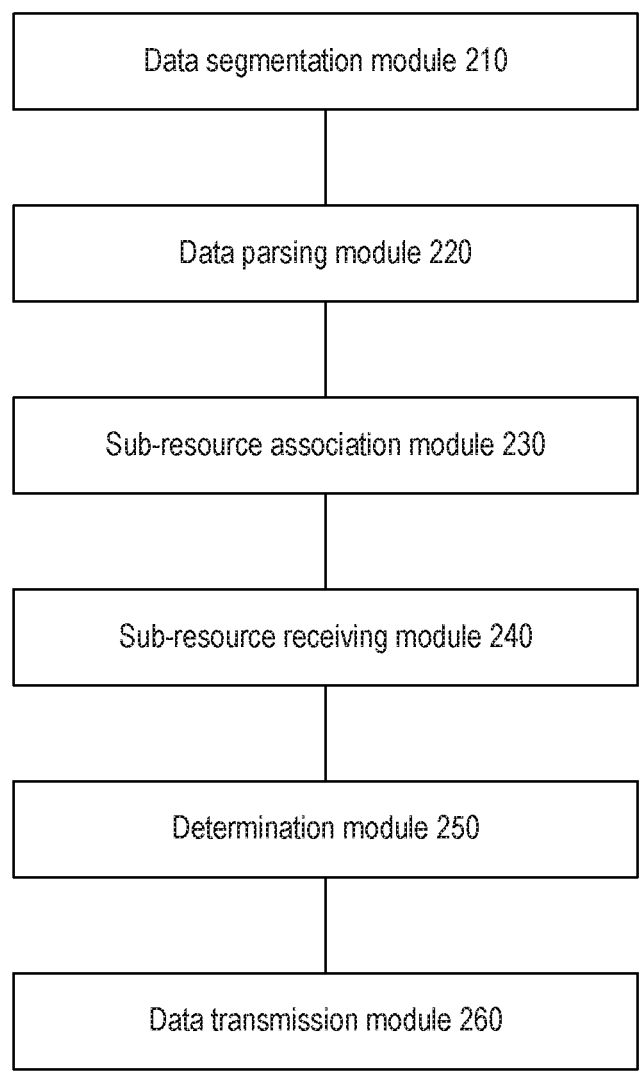
FIG. 3 is a schematic diagram illustrating a system for providing network resources at an intermediate server, consistent with embodiments of the present disclosure.

As shown in FIG. 3, web loading apparatus includes a data segmentation module 210, a data parsing module 220, an sub-resource association module 230, a sub-resource loading module 240, and a data transmission module 260.

Referring back to FIG. 2, mobile terminal 101 is communicatively coupled with intermediary server 102. To provide web page browsing, mobile terminal 101 transmits a web page loading request to intermediary server 102. A forwarding module (not shown) in the intermediary server 102 forwards the web page loading request to content server 103. Document data of a web page can then be acquired from content server 103.

After receiving the document data, data segmentation module 210 can divide the received data into multiple document data segments. In some embodiments, data segmentation module 210 can perform step S130 of method 100.

Thereafter, data parsing module 220 can parse the document data to identify sub-resources included in the document data. In some embodiments, data parsing module 220 can perform step S135 of method 100.

Sub-resource association module 230 can associate the sub-resources in the document data with the document data segments. In some embodiments, sub-resource association unit 230 can perform step S140 of method 100.

Sub-resource receiving module 240 can receive the sub-resources from resource server 104. Various resources for rendering the web page can be stored in resource server 104. After all sub-resources for a particular document data segments have been obtained from the sub-resource server 104, the data transmission module 260 can transmit the document data segments and all of the associated child resources to mobile terminal 101. The operations of sub-resource loading module 240 and data transmission module 260 can continue until all of the document data segments and their associated sub-resources have been transmitted to mobile terminal 101.

In addition, web loading apparatus 202 may further include a determination module 250. Determination module 250 can determine whether all of the document data segments and child resources thereof are returned to the mobile terminal. In a case where intermediary server 102 receives multiple portions of the document data, determination module 250 can also determine whether all portions of the document data and the associated sub-resources have been transmitted to mobile terminal 101. In some embodiments, sub-resource receiving module 240, determination module 250 and data transmission module 260 can perform steps S145-S175 of method 100.

Embodiments of the present disclosure provide a method and a system that divides document data of a web page into multiple data segments, associates sub-resources with each data segment, and transmits a data segment (and its associated sub-resources) to a mobile terminal if all of the sub-resources associated with that data segment have been obtained by the intermediary server. With such an arrangement, the transmission of the sub-resources can follow the same order as the sub-resources are displayed in the web page. As a result, the loading speed of the web page on the mobile terminal can be improved.

After testing, it is shown that, compared with the existing technology, embodiments of the present disclosure provide improvement in the browsing speed metrics, and in particular T0 and T3. For example, the test for loading a world-wide-web (www) portal website shows that, under the same testing environment, T0 is increased by about 75%, T1 is increased by about 55%, T2 is increased by about 45%, and T3 is increased by about 25%. In addition, compared with the case where the mobile terminal directly accesses the content server to load a web page, T1 for accessing various kinds of portal home pages can be improved by about 10%.

Figure 4A:
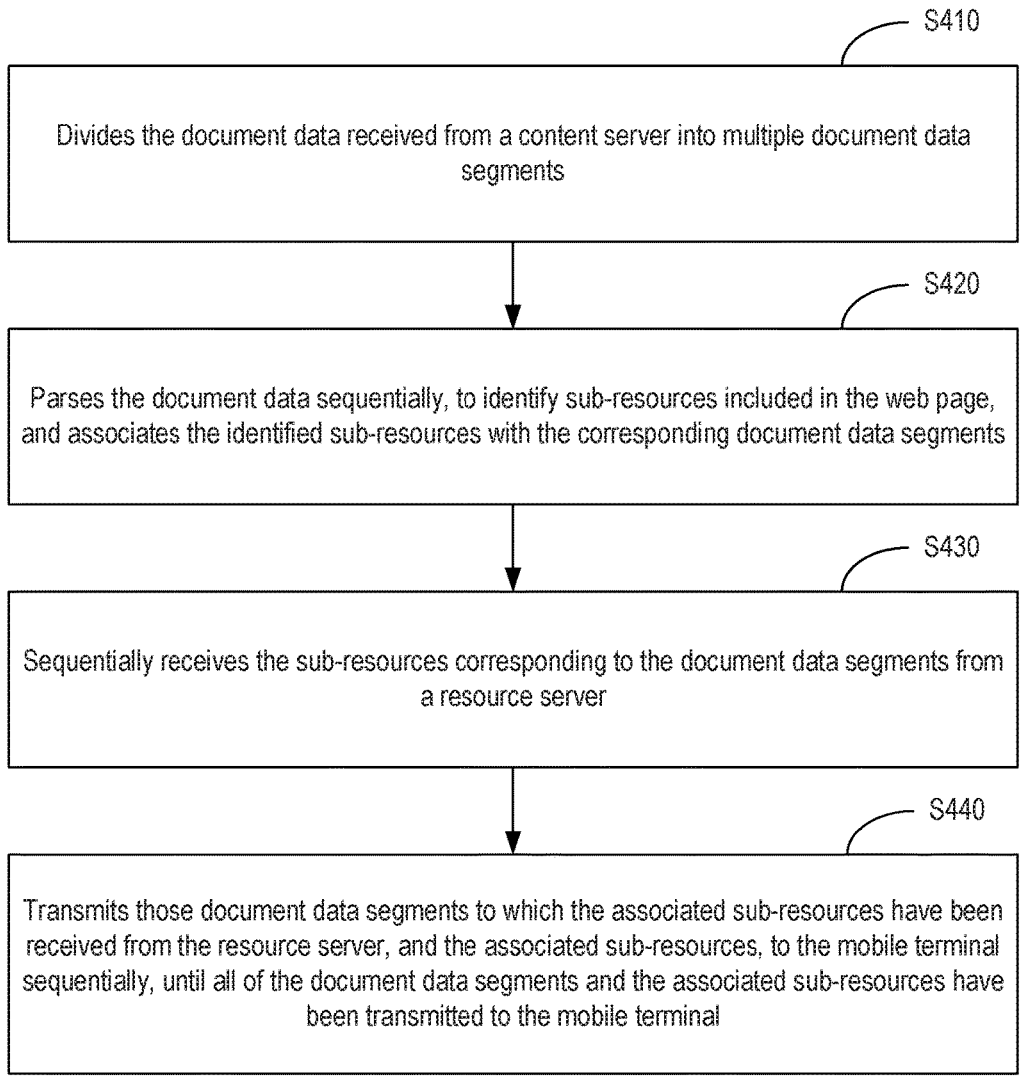
FIGS. 4A-B are flowcharts illustrating a method providing network resources to a browser, consistent with embodiments of the present disclosure.

Reference is now made to FIG. 4A, which is a flowchart illustrating an exemplary method 400 for providing network resources to a browser, consistent with embodiments of the present disclosure. Method 400 includes a sub-resource skipping mechanism for transmission of document data segments and associated sub-resources to a mobile terminal. As shown in FIG. 4A, method 400 can include the following steps:

In step S410, an intermediary server (e.g., intermediary server 102 of FIG. 1) divides the document data received from a content server into multiple document data segments, after forwarding a web page loading request received from a mobile terminal. The data segments can be generated based on a sequence of the document data.

In step S420, the intermediary server parses the document data sequentially, to identify sub-resources included in the document data, and associates the identified sub-resources with the corresponding document data segments.

In step S430, the intermediary server sequentially receives the sub-resources corresponding to the document data segments from a resource server.

In some embodiments, the intermediary server transmits requests for sub-resources associated with the document data segments sequentially to the resource server. The transmission can be performed when parsing the document data, such that each time the intermediary server parses the data and obtains one sub-resource, the intermediary server transmits a request corresponding to that sub-resource. The intermediary server can then receive the sub-resources from the resource server. Assuming that there are a first sub-resource and a second sub-resource, the request for the first sub-resource by the intermediary server is transmitted before the request for the second sub-resource, and that a data size of the first sub-resource is greater than the second sub-resource. As the intermediary server transmit the requests and start to receive the first and second sub-resources from the resource server, it is likely that the transmission of second sub-resource completes before that of the first sub-resource.

In step S440, the intermediary server transmits those document data segments to which the associated child resources have been received from the resource server, and the associated child resources, to the mobile terminal sequentially, until all of the document data segments and the associated child resources have been transmitted to the mobile terminal.

In some embodiments, step S440 further includes a sub-resource skipping mechanism as follows: if the transmission of a later sub-resource (e.g., second sub-resource) has been completed while a prior sub-resource (e.g., first sub-resource) is still undergoing transmission, the intermediary server can determine not to wait for the transmission of the first sub-resource to be complete, before transmitting the data segment associated with the first sub-resource. Instead, the intermediary server can transmit that data segment together with other associated sub-resources (if the transmissions of which have been complete) to the mobile terminal.

In some embodiments, the multiple document data segments can be numbered sequentially during generation, and the numbers can be of sequential natural numbers.

Figure 4B:
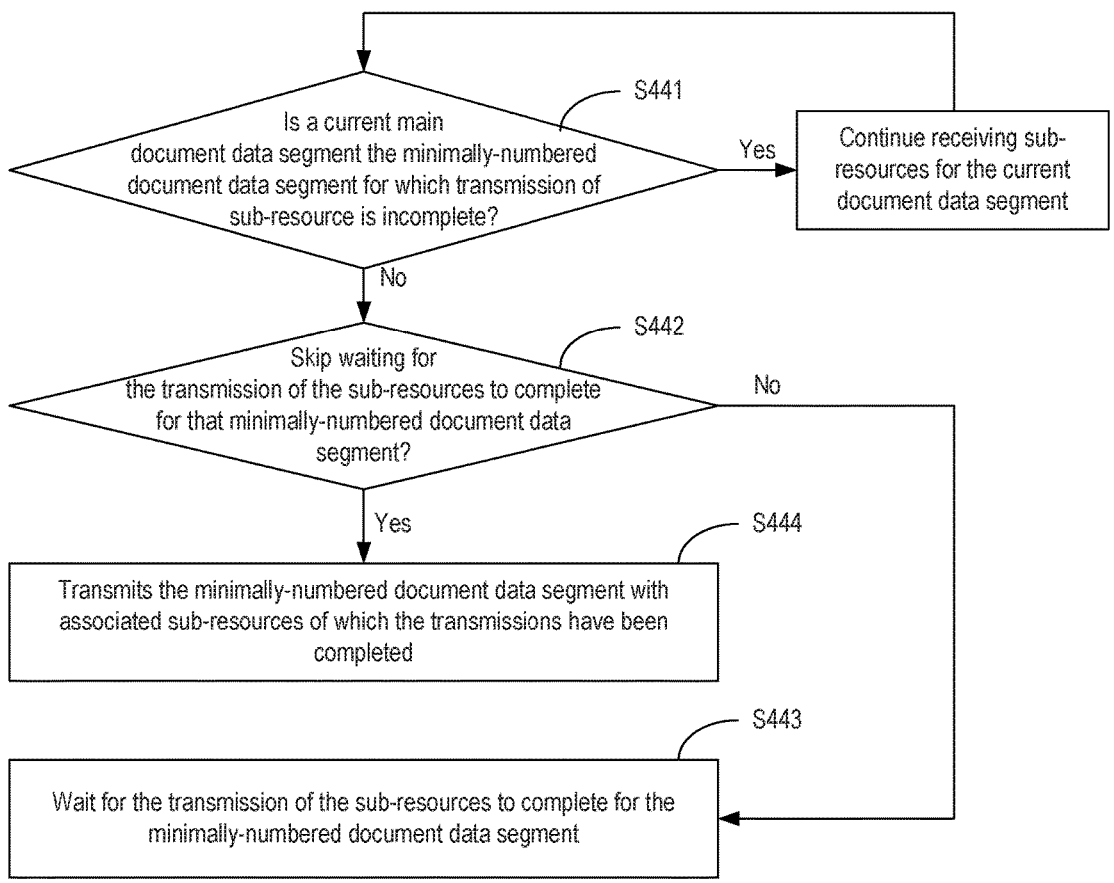

Reference is now made to FIG. 4B, which illustrates an exemplary method 450 for a sub-resource skipping mechanism that can be included in method 400 of FIG. 4A. As shown in FIG. 4B, method 450 can include the following steps:

In step S441, an intermediary server (e.g., server 102) determines, after receiving a sub-resource from a resource server, whether a current document data segment associated with the received sub-resource is associated with a number that satisfies a pre-determined condition. Such a pre-determined condition can be, for example, that the document data segment is associated with a minimum number among other document data segments that also have sub-resources of which transmission has not been completed.

If the intermediary server determines that the document data segment is not the minimally-numbered document data segment, the server can perform step S442, to determine whether to skip waiting for the transmission of the sub-resources to complete for that minimally-numbered document data segment. On the other hand, if the intermediary server determines that the current document data segment is the minimally-numbered document data segment, the server can continue receiving the sub-resources for the current document data segment, and then perform step S441 again.

In step S442, to determine whether to skip waiting for the transmission of the sub-resources to complete for that minimally-numbered document data segment, the intermediary server can determine a number of sub-resources that separate between the sub-resources of the current document data segment of which the transmissions have been completed, and the sub-resources of the current document data to be skipped. If that number exceeds a pre-determined number, the intermediary server can determine to skip waiting for the transmission of the sub-resources to complete for that minimally-numbered document data segment.

In some embodiments, the intermediary server can also include other criteria in determining skip waiting for the transmission of the sub-resources to complete for a particular document data segment. For example, the intermediary server can be configured to a set a number of skipping. As an illustrative example, if the number of skipping is set to 1, when intermediary server detects that the transmission of sub-resources of subsequent document data segments has been completed while the transmission of sub-resources of current document data segment is underway, the intermediary server will determine to skip waiting for the transmissions of these sub-resources to complete. On the other hand, if the number of skipping is set to 0, no skipping is allowed, and the server must wait until the transmission of all of the sub-resources of the current document data segment to complete before transmitting the data segment and the sub-resources to the mobile terminal.

Referring back to FIG. 4B, after the intermediary server determines not to skip waiting for the transmission of the sub-resources to complete for that minimally-numbered document data segment in step S442, the intermediary server can then perform step S443 to wait for the transmission to complete.

On the other hand, if the intermediary server determines to skip waiting for the transmission of the sub-resources to complete for that minimally-numbered document data segment in step S442, the intermediary server can perform step S244, the intermediary server can transmit that minimally-numbered document data segment together with some of the associated sub-resources (of which the transmissions have been completed) to the mobile terminal. Later, when the transmissions of the remaining sub-resources have been completed, the remaining sub-resources will be transmitted, together with subsequent document data segments.

An illustrative example is provided to further illustrate an operation of method 450. In this example, the document data of a web page is divided into a document data segment 1, a document data segment 2, and a document data segment 3. Document data segment 1 is associated with sub-resources 11 and 12. Document data segment 12 is associated with sub-resources 21, 22, and 23. Document data segment 3 is associated with sub-resources 31 and 32. Also, the number of skipping is set to 1, such that when the transmission of sub-resources of a subsequent document data segment (e.g., document data segment 2) has been completed while the transmission of sub-resources of current document data segment (e.g., document data segment 1) is underway, the intermediary server will determine to skip waiting for the transmission of sub-resources of the current document data segment to complete.

In this example, the intermediary server has transmitted document data segment 1 and its associated sub-resources 11 and 12 to the mobile terminal. The transmissions of sub-resources 21 and 23 of document data segment 2 have been completed as well, while the transmission of sub-resource 22 is not yet complete. While waiting for the transmission of sub-resource 22 to complete, the transmission of sub-resource 31 of data segment 3 has been completed. In this case, the intermediary server will transmit document data segment 2, together with sub-resources 21 and 23, to the mobile terminal, without waiting for the transmission of sub-resource 22 to complete. When the transmission of sub-resource 22 completes at a later time, the intermediary server can transmit sub-resource 22 together with another document data segment.

With embodiments of the present disclosure, by determining to skip waiting for transmission of certain sub-resources to complete based on one or more pre-determined conditions, the likelihood that the loading of a particular sub-resource affects the loading process of the entire document data and other sub-resources can be reduced. As a result, the loading speed of a web page can be significantly increased, leading to improved user experience.

Figure 5:
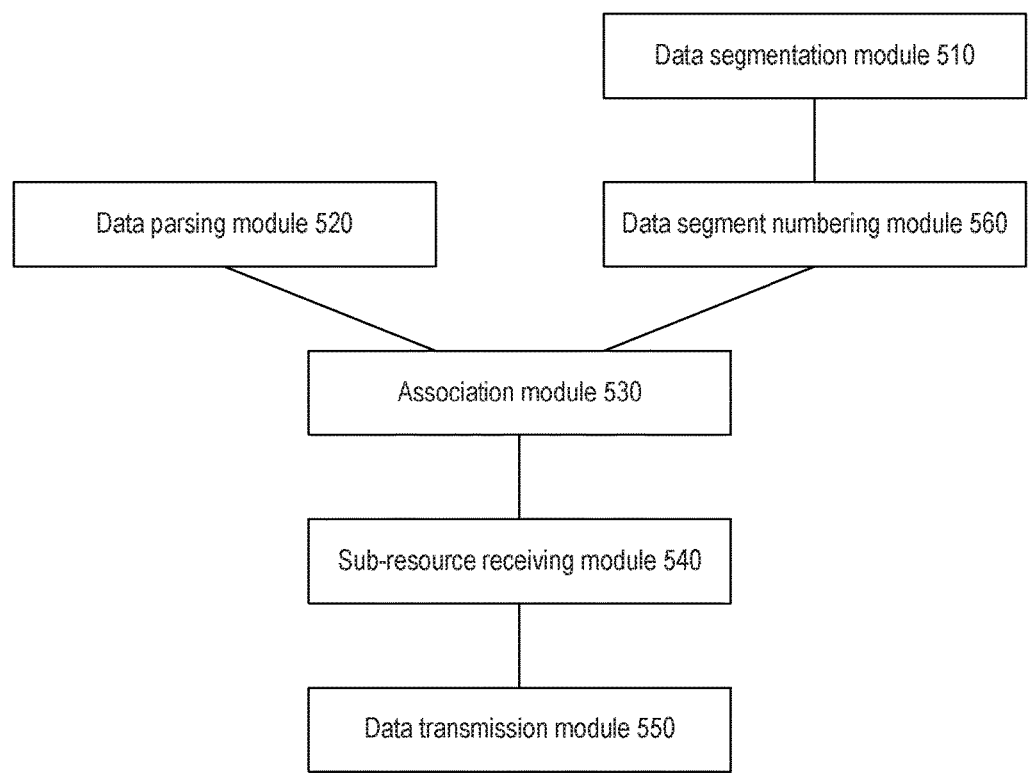
FIG. 5 is a schematic diagram illustrating a system for providing network resources at an intermediate server, consistent with embodiments of the present disclosure.

FIG. 5 is a schematic diagram illustrating an exemplary system 500 for providing network resources at an intermediate server, consistent with embodiments of the present disclosure. In some embodiments, various components of system 500 can perform steps of methods 400 and 450 of FIG. 4A-B. Referring to FIG. 5, system 500 includes a data segmentation module 510, a data parsing module 520, a data segment numbering module 560, a sub-resource association module 530, a sub-resource receiving module 540, and a data transmission module 550.

Data segmentation module 510 can divide document data transmitted by a content server into multiple document data segments, based on a size of the data. Data segmentation module 510 can perform, for example, step S410 of method 400.

Data parsing module 520 can parse the document data sequentially to identify sub-resources included in the document data. Data parsing module 520 can perform, for example, step S420 of method 400.

Sub-resource association module 530 can sequentially associate the identified sub-resources with the document data segments. Sub-resource receiving module 540 can sequentially receive sub-resources associated with the document data segments from a resource server, after transmitting loading requests for these sub-resources to the resource server. Sub-resource association module 530 and sub-resource receiving module 540 can perform, for example, step S430 of method 400.

Data transmission module 550 can transmit document data segments of which the transmissions of the associated sub-resources have been completed, as well as the associated sub-resources, sequentially to the mobile terminal, until all of document data segments and the associated child resources have been transmitted to the mobile terminal.

Data segment numbering module 560 can assign a number sequentially to the document data segments.

In some embodiments, system 500 can also perform method 450, in which data transmission module 550 can receive a skipped sub-resource of a previous document data segment (where the previous data segment is transmitted without waiting for the transmission of that sub-resource to complete), and transmit the skipped sub-resource together with a current document data segment of which the sub-resources have been completely transmitted from the resource server. Data transmission module 550 can further include a first determination sub-module, a second determination sub-module, and a transmission sub-module.

The first determination sub-module can determine whether a current document data segment associated with the received sub-resource is the minimally-numbered document data segment that also has sub-resources of which transmission has not been completed. The first determination sub-module can perform, for example, step S441 of method 450.

The second determination sub-module can determine whether to skip waiting for the transmission of the sub-resources to complete for that minimally-numbered document data segment, if the current document data segment associated with the received sub-resource is not that minimally-numbered document data segment. The second determination sub-module can perform, for example, step S442 of method 450.

Data transmission sub-module can determine to transmit the minimally-numbered document data segment with some of the associated sub-resources of which the transmissions have been completed. The data transmission sub-module can perform, for example, step S444 of method 450.

With embodiments of the present disclosure, by determining to skip waiting for transmission of certain sub-resources to complete based on one or more pre-determined conditions, the likelihood that the loading of a particular sub-resource affects the loading process of the entire document data and other sub-resources can be reduced. As a result, the loading speed of a web page can be significantly increased, leading to improved user experience.

As will be understood by those skilled in the art, various exemplary logic blocks, modules, circuits and algorithm steps described in combination with the disclosure herein can be implemented as electronic hardware, computer software or a combination thereof. In order to clearly describe such interchangeability of hardware and software, general description has been provided in terms of functions of various schematic components, blocks, modules, circuits and steps. Whether such functions are implemented as software or hardware depends on specific applications and design constraints applied to the whole system. Those skilled in the art can implement the functions in various manners for each specific application, but the manner of implementation should not be construed as outside the scope of the present disclosure.

Although various embodiments of the present disclosure have been disclosed, it should be noted that various changes and modifications can be made to those embodiments without departing from the scope of the claims. Functions, steps and/or actions of process claims according to the invention embodiments described herein do not need to be executed in any specific order. In addition, although elements of the present invention can be described or required in individual forms, they may also be assumed as multiple, unless the number thereof is explicitly limited as a singular number.

Although various embodiments according to the present invention have been described as above with reference to the accompanying drawings, those skilled in the art should understand that various improvements can also be made to the various embodiments disclosed without departing from the scope of the present disclosure. Therefore, the scope of the present invention should be determined the claims.

What is claimed is:

1. A method for providing access to web content, the method being performed by an intermediary server, comprising:
receiving, from a mobile terminal, a loading request for a web page;

receiving, from a content server, document data of the web page after forwarding the web page loading request to the content server;
dividing the received document data into a plurality of document data segments;
identifying sub-resources included in the web page;
associating the identified sub-resources with the document data segments;
transmitting a plurality of requests sequentially for the identified sub-resources to a resource server to start transmissions of at least some of the identified sub-resources from the resource server to the intermediary server; and
transmitting, to the mobile terminal, a first document data segment of the plurality of document data segments, after the transmissions of all of sub-resources associated with the first document data segment from the resource server to the intermediary server have completed.

2. The method of claim 1, wherein receiving, from a content server, document data of the web page after forwarding the web page loading request to the content server comprises: receiving a plurality of portions of document data from the content server.

3. The method of claim 2, wherein the one or more sizes of the plurality of document data portions are defined based on a file transfer protocol that comprises a Transmission Control Protocol/Internet Protocol.

4. The method of claim 1, wherein at least some of the plurality of document data segments are of different sizes.

5. The method of claim 1, wherein the web page loading request includes an indicator configured to indicate that the intermediary server divides the received document data into a plurality of document data segments.

6. The method of claim 1, wherein each of the plurality of document data segments is associated with a number that reflects an order of the document data segments in the document data, further comprising:
determining that a second document data segment is associated with a first sub-resource of which the transmission from the resource server is incomplete and with a second sub-resource of which the transmission is complete;
determining that a third document data segment is associated with a third sub-resource of which the transmission is complete, wherein the third document data segment is behind the second document data segment in the document data; and
transmitting the second document data segment with the second sub-resource when the transmission of the first sub-resource is incomplete, if the second document data segment is associated with a number that satisfies a pre-determined condition.

7. The method of claim 6, further comprising:
determining that transmission of the first sub-resource from the resource server is complete; and
transmitting the first sub-resource with the third document data to the mobile terminal.

8. The method of claim 6, wherein the pre-determined condition includes the second document data segment being associated with a minimum number among other document data segments that are associated with sub-resources of which transmission has not been completed.

9. The method of claim 1, wherein the identified sub-resources are sequentially associated with the document data segments based on an order of the document data segments.

10. An intermediary server for providing access to web content, comprising:
a memory that stores a set of instructions; and
one or more processors configured to execute the set of instructions to cause the intermediary server to perform:
receiving, from a mobile terminal, a loading request for a web page;
receiving, from a content server, document data of the web page after forwarding the web page loading request to the content server;
dividing the received document data into a plurality of document data segments;
identifying sub-resources included in the web page;
associating the identified sub-resources with the document data segments;
transmitting a plurality of requests sequentially for the identified sub-resources to a resource server to start transmissions of at least some of the identified sub-resources from the resource server to the intermediary server; and
transmitting, to the mobile terminal, a first document data segment of the plurality of document data segments, after the transmissions of all of sub-resources associated with the first document data segment from the resource server to the intermediary server have completed.

11. The intermediary server of claim 10, wherein receiving, from a content server, document data of the web page after forwarding the web page loading request to the content server comprises the one or more processors being configured to execute the set of instructions to cause the intermediary server to perform: receiving a plurality of portions of document data from the content server.

12. The intermediary server of claim 11, wherein the one or more sizes of the plurality of document data portions are defined based on a file transfer protocol that comprises a Transmission Control Protocol/Internet Protocol.

13. The intermediary server of claim 10, wherein at least some of the plurality of document data segments are of different sizes.

14. The intermediary server of claim 10, wherein the web page loading request includes an indicator configured to indicate that the intermediary server divides the received document data into a plurality of document data segments.

15. The intermediary server of claim 10, wherein each of the plurality of document data segments is associated with a number that reflects an order of the document data segments in the document data; wherein the one or more processors are further configured to execute the set of instructions to cause the intermediary server to perform:
determining that a second document data segment is associated with a first sub-resource of which the transmission from the resource server is incomplete and with a second sub-resource of which the transmission is complete;
determining that a third document data segment is associated with a third sub-resource of which the transmission is complete, wherein the third document data segment is behind the second document data segment in the document data; and
transmitting the second document data segment with the second sub-resource when the transmission of the first sub-resource is incomplete, if the second document data segment is associated with a number that satisfies a pre-determined condition.

16. The intermediary server of claim 15, wherein the one or more processors are further configured to execute the set of instructions to cause the intermediary server to perform:
   determining that transmission of the first sub-resource from the resource server is complete; and
   transmitting the first sub-resource with the third document data to the mobile terminal.

17. The intermediary server of claim 10, wherein the identified sub-resources are sequentially associated with the document data segments based on an order of the document data segments.

18. The intermediary server of claim 15, wherein the pre-determined condition includes the second document data segment being associated with a minimum number among other document data segments that are associated with sub-resources of which transmission has not been completed.

19. A non-transitory computer-readable medium that stores a program that, when executed by a processor, causes the processor to perform a method for providing access to web content, the method comprising:
   receiving, from a mobile terminal, a loading request for a web page;
   receiving, from a content server, document data of the web page after forwarding the web page loading request to the content server;
   dividing the received document data into a plurality of document data segments;
   identifying sub-resources included in the web page;
   associating the identified sub-resources with the document data segments;
   transmitting a plurality of requests sequentially for the identified sub-resources to a resource server to start transmissions of at least some of the identified sub-resources from the resource server to the intermediary server; and
   transmitting, to the mobile terminal, a first document data segment of the plurality of document data segments, after the transmissions of all of sub-resources associated with the first document data segment from the resource server to the intermediary server have completed.

20. The medium of claim 19, wherein receiving, from a content server, document data of the web page after forwarding the web page loading request to the content server comprises: receiving a plurality of portions of document data from the content server.

21. The medium of claim 20, wherein the one or more sizes of the plurality of document data portions are defined based on a file transfer protocol that comprises a Transmission Control Protocol/Internet Protocol.

22. The medium of claim 19, wherein at least some of the plurality of document data segments are of different sizes.

23. The medium of claim 19, wherein the web page loading request includes an indicator configured to indicate that the intermediary server divides the received document data into a plurality of document data segments.

24. The medium of claim 19, wherein each of the plurality of document data segments is associated with a number that reflects an order of the document data segments in the document data; wherein the method further comprises:
   determining that a second document data segment is associated with a first sub-resource of which the transmission from the resource server is incomplete and with a second sub-resource of which the transmission is complete;
   determining that a third document data segment is associated with a third sub-resource of which the transmission is complete, wherein the third document data segment is behind the second document data segment in the document data; and
   transmitting the second document data segment with the second sub-resource when the transmission of the first sub-resource is incomplete, if the second document data segment is associated with a number that satisfies a pre-determined condition.

25. The medium of claim 19, wherein the identified sub-resources are sequentially associated with the document data segments based on an order of the document data segments.

26. The medium of claim 24, wherein the pre-determined condition includes the second document data segment being associated with a minimum number among other document data segments that are associated with sub-resources of which transmission has not been completed.

* * * * *